United States Patent Office 2,879,131
Patented Mar. 24, 1959

2,879,131

PURIFICATION OF TITANIUM TETRACHLORIDE

Winfred J. Cauwenberg, Plainfield, N.J., and Albert Dietz, Lynchburg, Va., assignors to American Cyanamid Company, New York, N.Y., a corporation of Maine No Drawing. Application April 23, 1957
Serial No. 654,448

5 Claims. (Cl. 23—87)

The present invention relates to the purification of titanium tetrachloride. More particularly, the invention relates to the purification of liquid titanium tetrachloride containing a volatile vanadium impurity dissolved therein.

Titanium tetrachloride is generally produced by chlorinating an oxidic ferrotitaniferous material such as ilmenite, rutile, or ferrotitaniferous slag under reducing conditions, selectively condensing an iron chloride-titanium tetrachloride fraction from the gaseous mixture of metal chlorides which results, and distilling the mixture to form a titanium tetrachloride vapor. This vapor is usually better than 95% pure and may be condensed to form the crude liquid titanium tetrachloride of commerce.

The ferrotitaniferous ores and slags referred to above generally contain oxidic vanadium material which is converted to volatile form during chlorination along with the titanium values, so that the titanium tetrachloride produced as aforesaid normally has a dissolved content of vanadium as impurity. It is not uncommon for crude titanium tetrachloride prepared in this manner to contain 0.1%–1% by weight of vanadium calculated as $V_2O_5$.

A principal use of titanium tetrachloride is as raw material for the manufacture of titanium dioxide pigment. Titanium dioxide is white, and the presence of vanadium in such material is undesirable as it leads to the formation of off-color pigment.

The composition of the vanadium impurity has not been ascertained, but theory indicates that the vanadium is in the form of one or more vanadium chlorides or oxychlorides which are soluble in liquid titanium tetrachloride. The boiling point of at least one of these impurities (vanadium oxychloride, $VOCl_3$) is very close (127° C.) to the boiling point of titanium tetrachloride, which explains why these impurities tend to accompany titanium tetrachloride throughout normal purification processes which are based on distillations.

The discovery has now been made that liquid titanium tetrachloride having a volatile vanadium impurity dissolved therein can be purified by a process which comprises heating the titanium tetrachloride with a xanthate ester, after which a purified titanium tetrachloride can be recovered by filtration or distillation. Apparently the xanthate ester reacts with the vanadium impurity converting it to insoluble and non-volatile form. In numerous instances we have been successful in decreasing the vanadium content of the titanium tetrachloride from about 1% vanadium by weight calculated as $V_2O_5$, to less than 50 parts per million.

The purification treatment, according to a preferred embodiment of the invention, involves as its principal feature mixing the crude titanium tetrachloride with a xanthate ester and heating, the titanium tetrachloride being maintained in the liquid phase. At least part of the vanadium impurities are thereby converted to insoluble and non-volatile form. The purifying agent reacts with the vanadium and other similar impurities forming a sludge, after which purified titanium tetrachloride can be recovered by filtration or distillation.

The temperature at which the titanium tetrachloride is maintained during treatment is not at all critical, and it is frequently most convenient to reflux the material at atmospheric pressure. The reflux action provides sufficient agitation to maintain the purifying agent in uniformly distributed condition and the reaction proceeds rapidly, no more than 120 minutes having been required. If desired lower temperatures may be employed and there is evidence that the reaction proceeds slowly but at a quite useful rate at room temperature and particularly above 40° C., when sufficient agitation is provided to maintain dispersion of the purifying agent throughout the liquid.

In certain instances the xanthate esters tend to decompose at the reflux temperature of titanium tetrachloride forming an amber material which distills with the titanium tetrachloride. We have found that this decomposition can be decreased to a negligible value without unduly prolonging the reaction by maintaining the temperature of the titanium tetrachloride during treatment at an effective reaction temperature below about 90° C. and, if the titanium tetrachloride is distilled, performing the distillation under reduced pressure at a temperature below about 90° C. For convenience we prefer to recover the titanium tetrachloride by distillation and to perform both the reaction and the distillation at a temperature between 40° C. and 90° C.

The xanthate esters differ somewhat in the speed with which they react, and suitable time-temperature relationships can be easily determined for each xanthate by laboratory trial as shown in the examples below. The presence of straw- or amber-colored xanthate decomposition products in the purified titanium tetrachloride does not affect the color of titanium dioxide pigment produced therefrom.

The invention does not depend upon the addition of any particular amount of xanthate ester, and sufficient should be added to produce the amount of purification desired. As a rule of thumb, it may be initially assumed that our preferred agents are capable of converting volatile vanadium impurities to non-volatile form on roughly a weight-for-weight basis.

The xanthate monoesters are a known class of compounds conveniently produced by reacting an alcohol (or mixture of alcohols with carbon disulfide in the presence of an alkali, and the diesters may be produced by reacting the monoester salt with an alkyl or other suitable halide. From the point of view of chemical theory they are generally named as derivatives of the assumed xanthic acid,

We prefer the monoesters, either in free acide form or in the form of their salts, the monoesters appearing to react somewhat faster with the vanadium impurities than the diesters.

Our evidence is that the purifying action of the xanthate esters is chiefly due to the xanthic

grouping therein, and does not depend upon the particular ester group or groups present. Thus we may use higher alkyl xanthates such as dodecyl xanthate, cyclic xanthates such as cyclohexyl xanthate and phenyl xanthate, or unsaturated xanthates such as oleyl xanthate or allyl xanthate. Our results indicate that more fluid and more easily pumpable still foots are generally formed at shortest reaction time when the titanium tetrachloride is treated with a lower aliphatic and particularly a lower monoalkyl xanthates, and we thus prefer the lower monoalkyl xanthates wherein the alkyl groups contain not more than six carbon atoms.

The invention will be further described by the examples which follow. These examples represent specific embodiments of the invention and are not to be construed as limitations thereon. Parts are by weight unless otherwise stated.

*Examples 1–9*

The following illustrates the substantially complete purification of titanium tetrachloride according to the invention.

The titanium tetrachloride used was the crude product prepared by chlorinating ilmenite ore concentrate under reducing conditions to form a gaseous mixture containing the iron and titanium values in the ore, selectively condensing titanium tetrachloride after selective condensation of the iron chloride thereby forming a liquid condensate mixture predominantly composed of titanium tetrachloride but containing a substantial amount of iron chlorides, distilling the condensate to separate titanium tetrachloride therefrom, and condensing the titanium tetrachloride thus distilled. The crude titanium tetrachloride thus produced was found by analysis to contain 9,980 parts per million of vanadium impurities calculated as $V_2O_5$.

The effectiveness of xanthate esters as purifying agents was shown by uniformly mixing 200 gm. of the above-described crude titanium tetrachloride at room temperature with the amount of xanthate ester shown in the table below, heating the mixture in a distillation flask equipped with thermometer, stirrer, and air-cooled condenser for the time and at the temperature shown in the table, and distilling at atmospheric pressure, after which the distillate was analyzed for vanadium. In each instance, the distillate was light straw in color, most probably resulting from the presence of a trace of dissolved sulfur monochloride derived from partial decomposition of the zanthate.

Results are as follows:

In commecial practice the distilled titanium tetrachloride would normally be burned to titanium dioxide without condensation.

The results indicate that very satisfactory results are obtained when the weight of the xanthate ester is about equal to the weight of the vanadium impurity. Run 7 indicates that the xanthate ester reacts slowly at room temperature with the vanadium impurities.

*Example 10*

The procedure of Example 7 was repeated except that the titanium tetrachloride was distilled at a pressure of about 75 mm. of mercury (660°–70° C.).

The condensed titanium tetrachloride contained less than 50 parts per million of $V_2O_5$ and was nearly water-clear in color.

We claim:

1. A process for purifying crude liquid titanium tetrachloride having a volatile vanadium impurity dissolved therein which comprises heating said titanium tetrachloride with a xanthate ester thereby rendering at least a part of the vanadium in said impurity insoluble and non-volatile.

2. A process according to claim 1 wherein the xanthate ester is a lower monoalkyl xanthate.

3. A process according to claim 2 wherein the xanthate ester is mono secondary butyl xanthate.

4. A process according to claim 1 wherein the temperature at which the titanium tetrachloride is heated with the xanthate ester is between about 40° C. and 90° C.

5. A process for purifying crude liquid titanium tetrachloride having a volatile vanadium dissolved therein, which comprises uniformly admixing a lower monoalkyl xanthate with said titanium tetrachloride, heating the resulting mixture thereby rendering at least a part of said vanadium impurity insoluble and non-volatile, and then distilling the treated titanium tetrachloride to recover purified titanium tetrachloride therefrom, the temperature of said heating and said distillation being between about 40° C. and 90° C.

References Cited in the file of this patent

UNITED STATES PATENTS

| | | |
|---|---|---|
| 1,778,987 | Stevens et al. | Oct. 21, 1930 |
| 2,289,327 | Pechukas | July 7, 1942 |
| 2,289,328 | Pechukas | July 7, 1942 |

| Ex. | Xanthate Added | | Heating | | $V_2O_5$ Contents, p.p.m. |
|---|---|---|---|---|---|
| | Name | Amt.[1] Percent | Temp., °C. | Time, Min. | |
| Blank | None | | 136 | 30 | 9,980 |
| 1 | Monoethyl [2] | 2 | 136 | 30 | <50 |
| 2 | Monoisopropyl [2] | 2 | 136 | 30 | <50 |
| 3 | Mono sec. butyl [3] | 2 | 136 | 30 | <50 |
| 4 | Monoamyl [3] | 2 | 136 | 30 | <50 |
| 5 | ----do [3] | 1 | 136 | 30 | <50 |
| 6 | ----do [3] | 1 | 90 | 120 | <50 |
| 7 | ----do [3] | 2 | 40 | 360 | <50 |
| 8 | Cellulose [4] | 1 | 136 | 30 | <50 |
| 9 | Monoallyl [2] | 2 | 136 | 30 | <50 |
| 10 | Mono-2 methoxyethyl [2] | 2 | 136 | 30 | <50 |
| 11 | Diamyl | 2 | 136 | 60 | <50 |

[1] Based on weight of titanium tetrachloride.
[2] As sodium or potassium salt.
[3] As free acid.
[4] Dried viscose solution (sodium cellulose xanthate).